United States Patent [19]

Inai

[11] 4,437,186
[45] Mar. 13, 1984

[54] WASTE GAS APPARATUS FOR ELECTRIC FURNACE

[75] Inventor: Kunihiro Inai, Takarazuka, Japan

[73] Assignee: Nikko Industry Co., Ltd., Hyogo, Japan

[21] Appl. No.: 362,989

[22] Filed: Mar. 29, 1982

[30] Foreign Application Priority Data

Nov. 21, 1981 [JP] Japan .............. 56-175269[U]

[51] Int. Cl.³ .............................................. F27D 7/00
[52] U.S. Cl. ........................................... 373/9; 373/80
[58] Field of Search ............... 373/8, 9, 80; 266/156, 266/159, 158; 98/115 R

[56] References Cited

U.S. PATENT DOCUMENTS 3,163,520  12/1964  Collin et al. ................ 373/80 X
3,565,407  2/1971   Schermer .................... 373/80 X Primary Examiner—Roy N. Envall, Jr.
Attorney, Agent, or Firm—Armstrong, Nikaido, Marmelstein & Kubovcik

[57] ABSTRACT

A primary duct is provided for supplying hot waste gas from an electric furnace to a preheater bucket charged with scrap. A preheating waste gas duct connected to the bucket is branched into a discharge duct for releasing preheating waste gas from the apparatus and a recycling duct for recycling preheating waste gas to the primary duct. In the vicinity of the junction of the primary duct and the recycling duct, an air inlet is formed for supplying air into the primary duct for burning the preheating waste gas.

6 Claims, 6 Drawing Figures

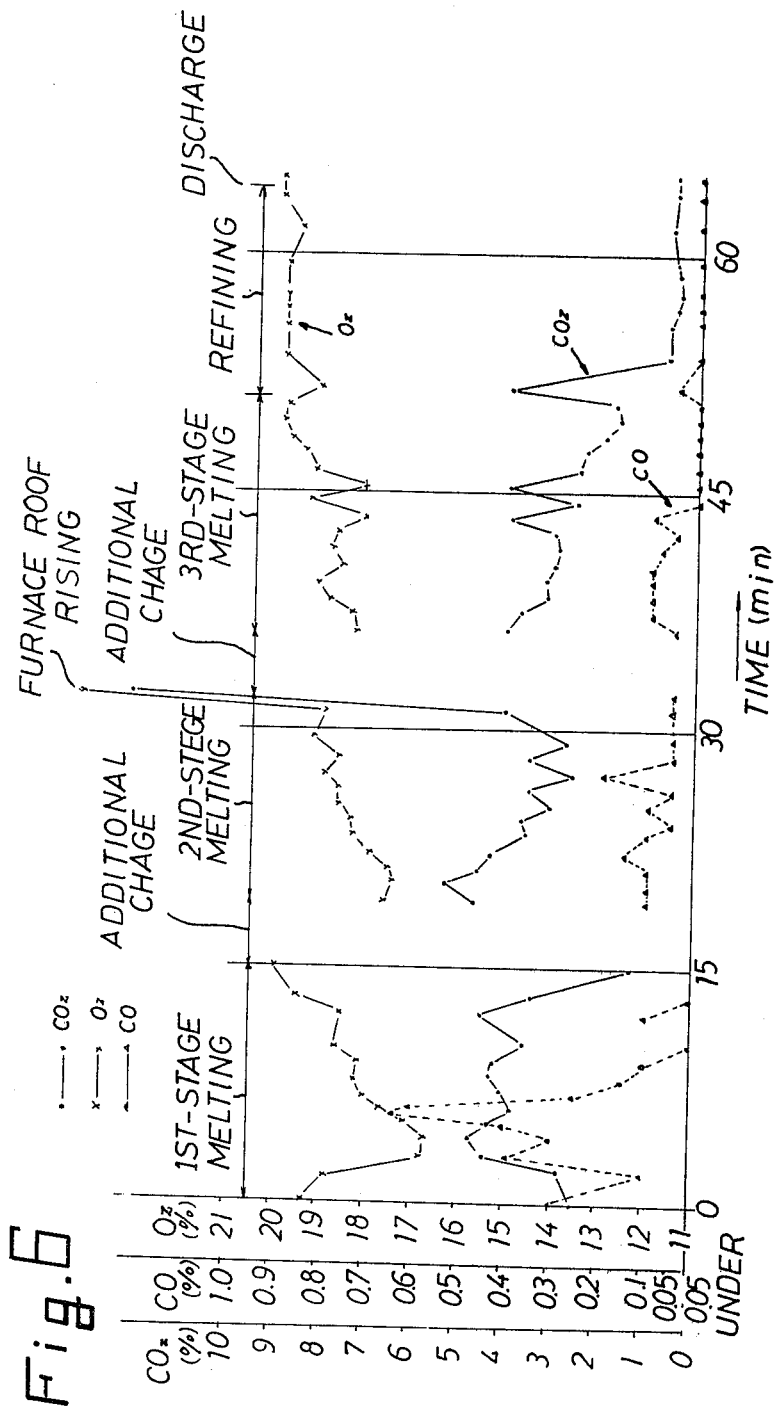

WASTE GAS APPARATUS FOR ELECTRIC FURNACE

BACKGROUND OF THE INVENTION

The present invention relates to an apparatus for utilizing waste gas from electric furnaces, and more particularly to a novel apparatus for use with scrap preheaters which utilize the sensible heat of waste gas from electric furnaces, for preventing secondary pollution that will result from noxious odor and white fumes, i.e. hydrocarbon gases, released from the preheater.

Waste gas apparatus for electric furnaces usually comprises a combustion chamber or heat storage chamber for receiving hot waste gas from the electric furnace through a water-cooled duct, a preheater bucket for receiving part or all of the hot waste gas from the chamber by way of a preheater duct and a hood to preheat the scrap accommodated therein, and a dust collector connected to the bucket for releasing the preheating waste gas to the atmosphere after the gas has been subjected to heat exchange with the scrap within the bucket.

The scrap charged in the preheating bucket is heated by direct contact with the waste gas, and the oils, rubbers, plastics and other extraneous materials contained in the scrap are incompletely burned or baked, inevitably releasing white smoke or fumes and noxious odors into the resulting waste gas. Accordingly the waste gas, if released to the atmsophere, will cause secondary pollution. An afterburning chamber is therefore usually provided between the preheater bucket and the dust collector for burning the oils, organic materials, etc. contained in the preheating waste gas.

However, even if a waste gas supply is introduced into the afterburning chamber from the heat storage chamber via a main duct, the waste gas resulting from preheating can not be burnt completely with the heat of the gas supply only, so that an auxiliary burner or the like is needed for the afterburning chamber. Consequently it is impossible to achieve savings in energy, while the apparatus involves problems, for example, in maintenance.

SUMMARY OF THE INVENTION

An object of the present invention is to recycle the waste gas used for preheating scrap to a duct in the vicinity of an electric furnace to completely burn the preheating waste gas and thereby eliminate the likelihood of secondary pollution.

Another object of the invention is to provide an inlet of simple construction for supplying air for burning the preheating waste gas.

Another object of the invention is to cause a flow of preheating waste gas to interfere with the flow of air supplied through the air inlet to regulate the air supply and to reuse the preheating waste gas as a substitute for air.

Another object of the invention is to effectively supply air at the confluence of the waste gas resulting from preheating and a supply of hot waste gas to achieve a high combustion efficiency.

Another object of the invention is to provide a heat storage chamber between a scrap preheating chamber and the confluence of the preheating waste gas and a supply of hot waste gas to burn the preheating waste gas with an improved efficiency.

Another object of the invention is to cause the preheating waste gas to eventually pass through the heat storage chamber and then through a dust collector to the atmosphere to burn to the greatest possible extent the oil mist and the like contained in the preheating waste gas and to thereby control secondary pollution.

Other objects of the invention will become apparent from the following description with reference to the accompanying drawings.

BRIEF DESCRIPTION OF THE DRAWINGS

FIG. 6 is a graph showing the components of waste gas resulting from preheating of scrap.

DESCRIPTION OF THE PREFERRED EMBODIMENTS

Figure 1:
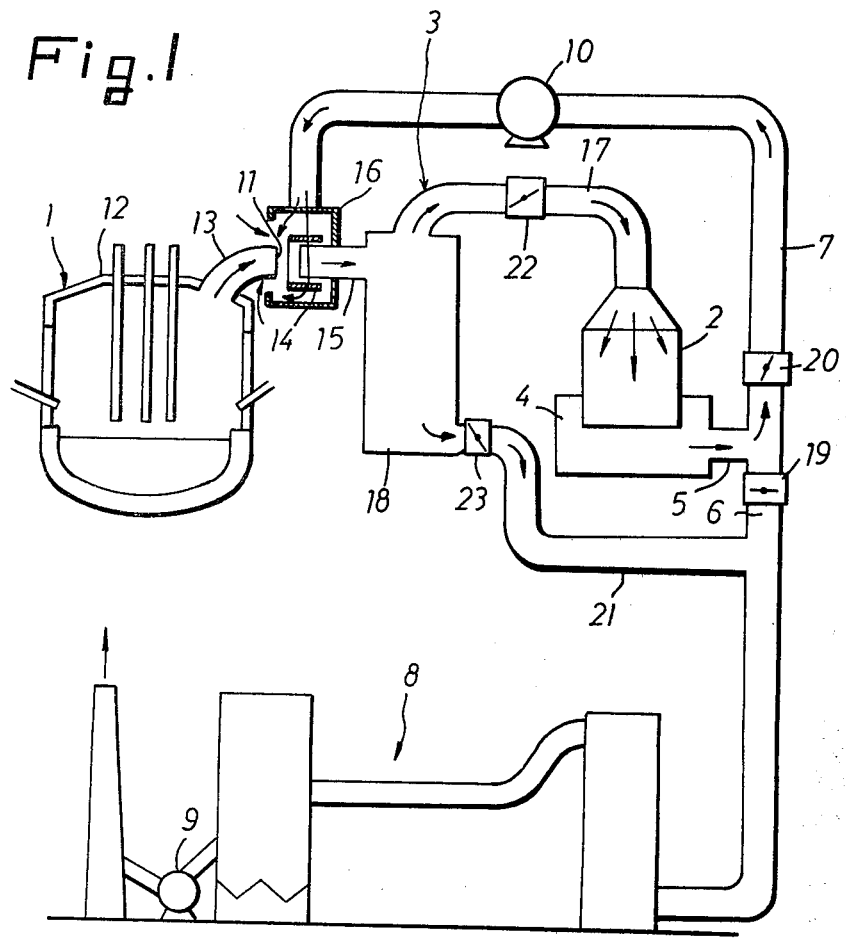
FIG. 1 is a diagram showing a preferred embodiment of the invention in its entirety.

FIG. 1 shows the most preferred embodiment. Hot waste gas is supplied from an electric furnace 1 through a primary duct 3 into a bucket 2 for preheating the scrap charged therein. The preheater bucket 2 is removably placed in a preheater pit 4. A duct 5 for the waste gas resulting from preheating is connected to the pit 4, i.e. to the bucket 2. The preheating waste gas duct 5 is divided into a discharge duct 6 and a recycling duct 7. Through the discharge duct 6, the preheating waste gas from the duct 5 is discharged from the apparatus to the atmosphere by way of a dust collector 8 and a blower 9. The gas from the duct 5 is also partly guided into the primary duct 3 through the recycling duct 7 which has a fan 10 at an intermediate portion thereof.

In the vicinity of the junction of the primary duct 3 and the recycling duct 7, there is an air inlet 11 for introducing into the primary duct 3 air for burning the preheating waste gas. The primary duct 3 comprises an elbow 13 attached to the roof 12 of the electric furnace 1 and a water-cooled duct 15 detachably connected to the elbow 13 by a slide duct 14. The clearance between the elbow 13 and the water-cooled duct 15 serves as the air inlet 11. The recycling duct 7 is connected to a hood 16 covering the slide duct 14 and the air inlet 11. Atmospheric air is introduced into the primary duct 3 through the clearance between the hood 16 and the elbow 13 and the air inlet 11.

The slide duct 14 is fittable around the elbow 13 and the water-cooled duct 15 and slidable axially thereof by an unillustrated cylinder. The amount of air flowing into the air inlet 11 is adjustable by sliding the slide duct 14. Furthermore, the clearance between the hood 16 and the elbow 13 is also dimensionally adjustable, while the hood 16 is hermetically connected to the water-cooled duct 15.

The primary duct 3 further comprises a preheater duct 17 extending from the preheater bucket 2 and lined with a refractory to assure heat resistance and heat insulation. A heat storage chamber 18 is interposed between the preheater duct 17 and the water-cooled duct 15. The discharge duct 6 and the recycling duct 7 are provided with dampers 19 and 20 respectively. The discharge duct 6 is connected to the heat storage chamber 18 by a main duct 21. The preheater duct 17 and the main duct 21 are provided with dampers 22 and 23 respectively. The dampers 19, 20, 22 and 23 are openable and closable for adjustably passing the waste gas partially or wholly.

The most preferred embodiment described above operates in the following manner.

The hot waste gas produced in the furnace 1 passes through the elbow 13 and the water-cooled duct 15 into the heat storage chamber 18 and then dividedly flows into the preheater duct 17 and the main duct 21. The portion of waste gas flowing into the duct 17 preheats the scrap charged in the bucket 2, then passes through the duct 5 and the recylcing duct 7 and flows into the hood 16.

The preheating waste gas thus recycled mixes with atmospheric air flowing in through the clearance between the hood 16 and the elbow 13 and needed for combustion and flows into the primary duct 3, i.e. the water-cooled duct 15, through the air inlet 11.

Since the waste gas produced in the electric furnace has a temperature of about 1200° C. in the vicinity of the slide duct 14, CO, oils and organic compounds contained in the preheating waste gas completely burn efficiently when mixed with the air. The water gas completely and efficiently burned dividedly flows into the preheater duct 17 and the main duct 21 again. Thus the gas is partly used for preheating and partly released to the atmosphere from the main duct 21 through the dust collector 8. Because the latter portion of waste gas is released to the atmosphere after passing through the heat storage chamber 18, the gas burns more completely, whereby secondary pollution is controlled.

With the above apparatus, the recycled preheating waste gas is brought into direct contact with flames of hot waste gas from the furnace 1 and eventually joins the hot gas at a temperature of at least 700° C. at which oils and organic materials completely burn, whereby odor, oil mist, white smoke or fumes, etc. can be eliminated without depositing on the duct inner surfaces, and the heat recovered efficiently.

It is now assumed that the hot waste gas has a temperature of 1200° C. and is supplied at a flow rate of 600 Nm$^3$/min, the preheating waste gas has a temperature of 200° C. and a flow rate of Q Nm$^3$/min, air is supplied at a temperature of 60° C. and at a flow rate of 200 Nm$^3$/min and the confluent gas flow has a temperature of 700° C., and that the apparatus involves the following relation on a simplified basis:

$$1200 \times 600 + 200 \times 60 + 200Q = (600 + 200 + Q) \times 700.$$

Q is then apprximately 340 Nm$^3$/min.

In the above case, the sensible heat of the waste gas (specific heat: 0.34 kcal/C Nm$^2$/min) used for preheating the scrap is given by:

$$340 \times 0.34 \times 700 \times (60/860) = 5646 \text{ KWH}.$$

Assuming that the amount of scrap treated is 60 tons, this value corresponds to $5646/60 \approx 94$ KWH/ton. When the preheating efficiency (the amount of heat used for preheating/total heat input) is 0.3, the amount of electric power saved is $94 \times 0.3 \approx 30$ KWH.

Figure 2:
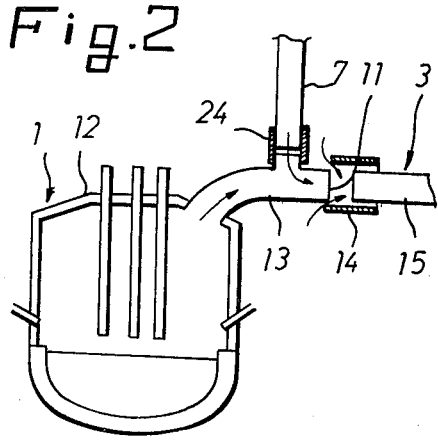
FIG. 2 is a diagram showing a partial modification of the embodiment.

FIG. 2 shows a partial modification of the above embodiment. The junction of the primary duct 3 and the recycling duct 7 is positioned at an axially intermediate portion of the elbow 13, and an air inlet 11 is formed in the vicinity of the junction. Another slide duct 24 interconnects the recycling duct 7 and the intermediate portion of the elbow 13.

Figure 3:
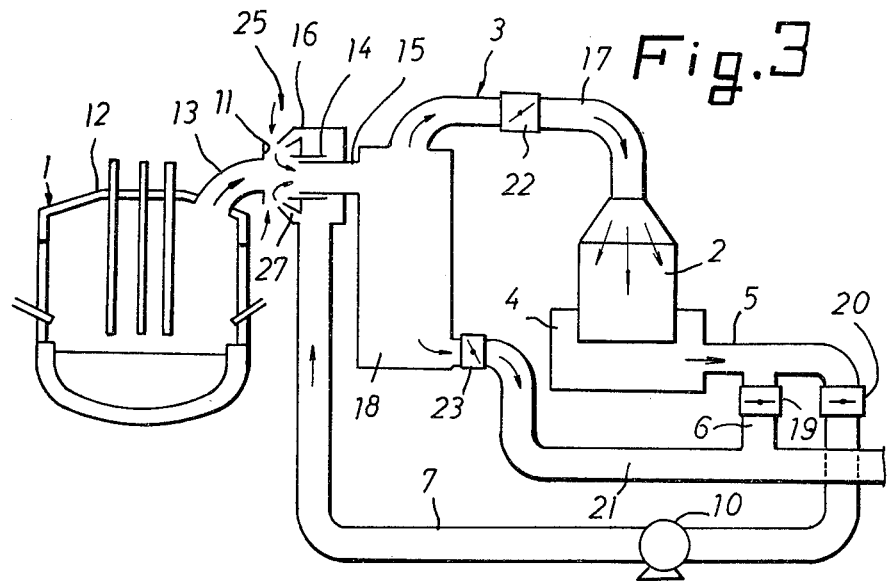
FIG. 3 is a diagram showing another embodiment of the invention.
Figure 4:
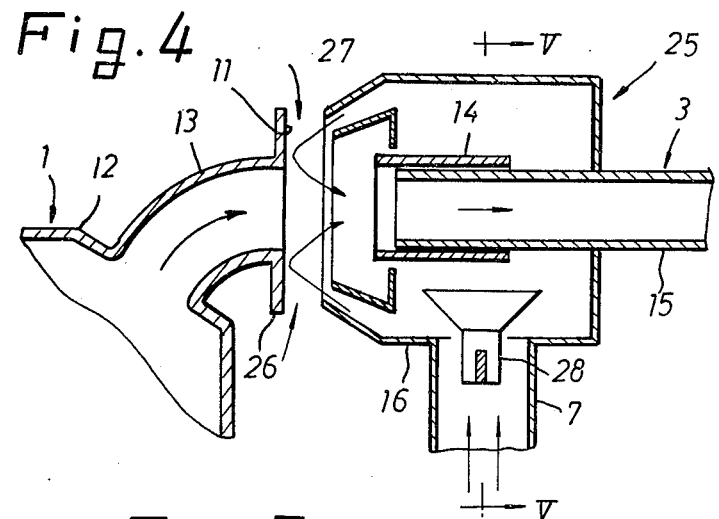
FIG. 4 is a fragmentary enlarged view in section of FIG. 3.
Figure 5:
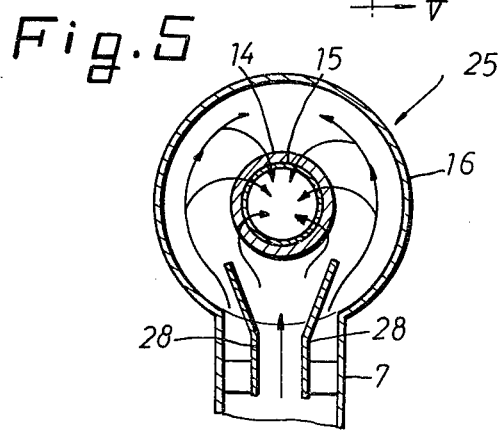
FIG. 5 is a view in section taken along the line V—V in FIG. 4.

FIGS. 3 to 5 show another embodiment of the invention. To regulate the amount of air to be supplied from an air inlet 11, an injector 25 is arranged at the junction of a primary duct 3 and a recycling duct 7 for guiding preheating waste gas in a direction to interfere with the flow of the air, i.e. to intersect the air flow.

The injector 25 has a hood 16 covering a slide duct 14 fitting around a water-cooled duct 15 and slidable axially thereof. The hood 16 is in the form of a hollow cylinder coaxial with the water-cooled duct 15. One end of the recycling duct 7 is connected to an outer peripheral portion of the hood 16. An elbow 13 extending from an electric furnace 1 has a flange 26 at its free end. At the end of the hood 16 opposed to the elbow 13 axially thereof, the hood 16 is formed with a gas discharge outlet 27 which is directed radially inwardly thereof toward the face of the flange 26. Air is led into the water-cooled duct 15 through the space between the flange 26 and the gas outlet 27 and through the air inlet. The connection between the recycling duct 7 and the hood 16 is internally provided with a pair of flow guide plates 28, 28, whereby the preheating waste gas in the duct 7 is guided into the hood 16 and is uniformly distributed circumferentially of the hood 16. Thus the gas led into the gas discharge outlet 27 is uniformly distributed.

With the arrangement described above, the preheating waste gas jetting out from the gas outlet 27 interferes with the air to be led into the water-cooled duct 15 through the space between the flange 26 and the gas outlet 27 and through the air inlet 11, regulating the air supply to a minimum amount required and giving a uniform mixture of air and preheating waste gas. Since only a required quantity of atmospheric air of low temperature (about 25° C.) can be led in, the inlet of a preheater bucket 2 can be maintained at a temperature of about 500° to about 600° C. At the location where the preheating waste gas and the waste gas from the furnace 1 are mixed together and burned, the apparatus has a temperature of 600° to 800° C., at which gaseous hydrocarbons which result from the preheting of scrap and which are the components of odor and white smoke or fume can be completely burned and eliminated with a high efficiency.

Because the waste gas from the preheater is reused with the supply of outside air minimized, the apparatus retains a high capacity to aspirate the waste gas from the electric furnace and will not greatly influence the efficient operation of the furnace 1.

When the scrap to be preheated has a good quality, that is, if it is free from combustible materials such as oils and rubbers, the dampers 20, 23 in the recycling duct 7 and the main duct 21 are closed, with the dampers 22, 19 of the preheater duct 17 and the discharge duct 6 open, to supply the whole amount of hot waste gas from the electric furnace 1 to the preheater bucket 2, whereby heat can be recovered efficiently without entailing secondary pollution.

FIG. 6 is a graph showing the components of the waste gas resulting from the preheating of scrap for a 50-ton electric furnace. It is seen that the gas has an $O_2$ content of at least 16% and is therefore satisfactorily usable for combustion. Accordingly when the preheating waste gas is recycled to the primary duct 3, the gas can be used in place of, or conjointly with, outside air for efficiently burning the combustibles in the waste gas.

What is claimed is:

1. A waste gas recycling apparatus for an electric furnace comprising:
   a heat storage chamber;
   a preheater bucket charged with scrap;
   a first duct positioned between said electric furnace and said heat storage chamber;
   a second duct connected from said heat storage chamber to said preheater bucket;
   a recycling duct connected between said preheater bucket and said first duct; and
   an air inlet located at the juncture of said recycling duct and said first duct and so arranged that hot waste gas from said furnace and recycled gas from said preheater bucket are mixed with air and fed through said first duct to said heat storage chamber.

2. A waste gas recycling apparatus as claimed in claim 1, wherein said first duct comprises an elbow connected to said electric furnace and a water-cooled duct connected to said heat storage chamber, a clearance being provided between said elbow and said water-cooled duct and serving as said air inlet, and further comprising a hood arranged about said first duct at said clearance, said recycling duct being connected to said hood.

3. A waste gas recycling apparatus as claimed in claim 2, further comprising a slide duct positioned about said water-cooled duct within said hood for adjusting the opening of said air inlet.

4. A waste gas recycling apparatus as claimed in claim 2, wherein said elbow is formed with an annular flange at the end adjacent said air inlet, and said hood is formed with an annular gas outlet directed toward said flange.

5. A waste gas recycling apparatus as claimed in claim 1, further comprising a main duct connected to said heat storage chamber for releasing waste gas to the atmosphere, and a discharge duct connected between said main duct and said recycling duct.

6. A waste gas recycling apparatus as claimed in claim 5, further comprising adjustable dampers positioned within said second duct, within said recycling duct, within said discharge duct, and within a portion of said main duct close to said heat storage chamber.

* * * * *